(12) United States Patent
Wyatt et al.

(10) Patent No.: US 9,200,737 B2
(45) Date of Patent: Dec. 1, 2015

(54) HOSE CLAMP

(71) Applicant: Norma U.S. Holding LLC, Auburn Hills, MI (US)

(72) Inventors: David Wyatt, Lenox, MI (US); Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 13/624,367

(22) Filed: Sep. 21, 2012

(65) Prior Publication Data

US 2013/0074290 A1 Mar. 28, 2013

Related U.S. Application Data

(60) Provisional application No. 61/538,233, filed on Sep. 23, 2011.

(51) Int. Cl.
*F16L 33/08* (2006.01)

(52) U.S. Cl.
CPC .............. *F16L 33/08* (2013.01); *Y10T 24/1427* (2015.01)

(58) Field of Classification Search
CPC ....... F16L 33/08; F16L 33/04; Y10T 24/1427
USPC ................................ 24/20 R, 274 R, 274 WB
See application file for complete search history.

(56) References Cited

U.S. PATENT DOCUMENTS

| | | | | |
|---|---|---|---|---|
| 4,099,304 A | * | 7/1978 | Luc | 24/274 R |
| 4,887,334 A | * | 12/1989 | Jansen et al. | 24/23 R |
| 5,315,737 A | * | 5/1994 | Ouimet | 24/274 R |
| 5,560,087 A | * | 10/1996 | Marques | 24/274 R |
| 5,787,555 A | * | 8/1998 | Chen | 24/274 R |
| 5,809,619 A | * | 9/1998 | Schaub | 24/274 R |
| 5,956,817 A | * | 9/1999 | Chen | 24/274 R |
| 7,322,618 B2 | | 1/2008 | Henrich et al. | |
| 7,467,442 B2 | * | 12/2008 | Chen | 24/281 |
| D609,997 S | * | 2/2010 | Andersson | D8/396 |
| 8,060,991 B2 | * | 11/2011 | Ryhman et al. | 24/274 R |

(Continued)

FOREIGN PATENT DOCUMENTS

| | | |
|---|---|---|
| WO | WO85-02894 | 7/1985 |
| WO | WO87-00602 | 1/1987 |
| WO | WO95-08073 | 3/1995 |

OTHER PUBLICATIONS

International Search Report for PCT/US2012/056672, Feb. 26, 2013, 3 pages.

(Continued)

*Primary Examiner* — Robert J Sandy
*Assistant Examiner* — David Upchurch
(74) *Attorney, Agent, or Firm* — Reising Ethington P.C.

(57) ABSTRACT

A hose clamp includes a band and a worm drive mechanism. The band has a set of slots located between a first and second circumferential end of the band. The worm drive mechanism is connected to the band and causes radial contraction of the band to tighten the band. The worm drive mechanism includes a screw that engages the set of slots for radial contraction of the band. A clamping-pressure-restoring construction is provided in order to maintain a seal between the hose clamp and an underlying hose during use of the hose clamp and when the underlying hose experiences size expansion and contraction due to, for example, temperature fluctuations.

15 Claims, 3 Drawing Sheets

(56) References Cited

U.S. PATENT DOCUMENTS

2004/0098843 A1\* 5/2004 Chen .......................... 24/274 R
2006/0064854 A1 3/2006 Chen

OTHER PUBLICATIONS

Written Opinion for PCT/US2012/056672, Feb. 26, 2013, 6 pages.

\* cited by examiner

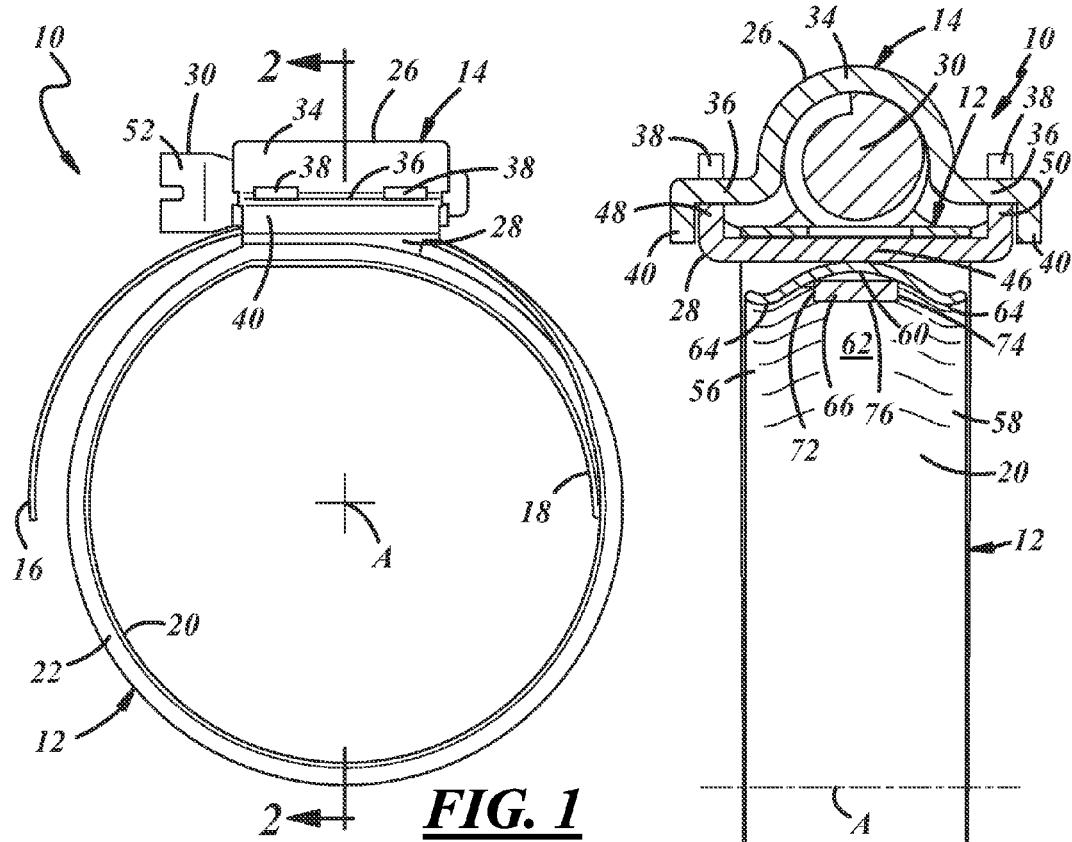
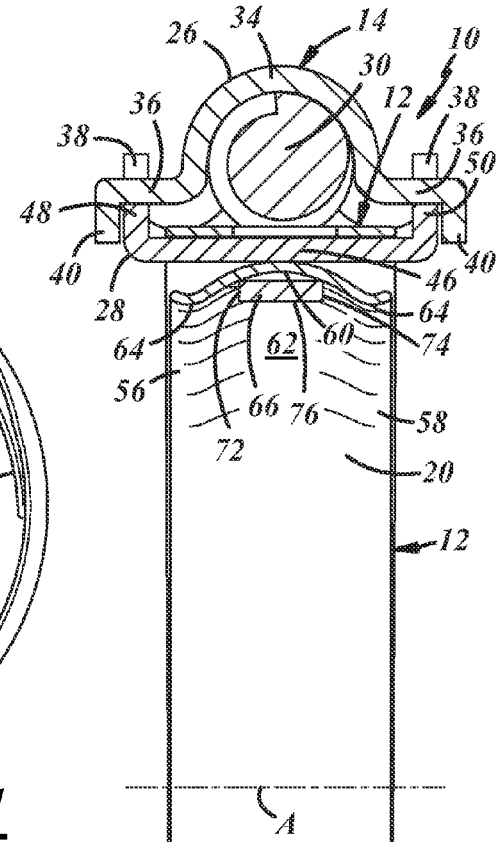
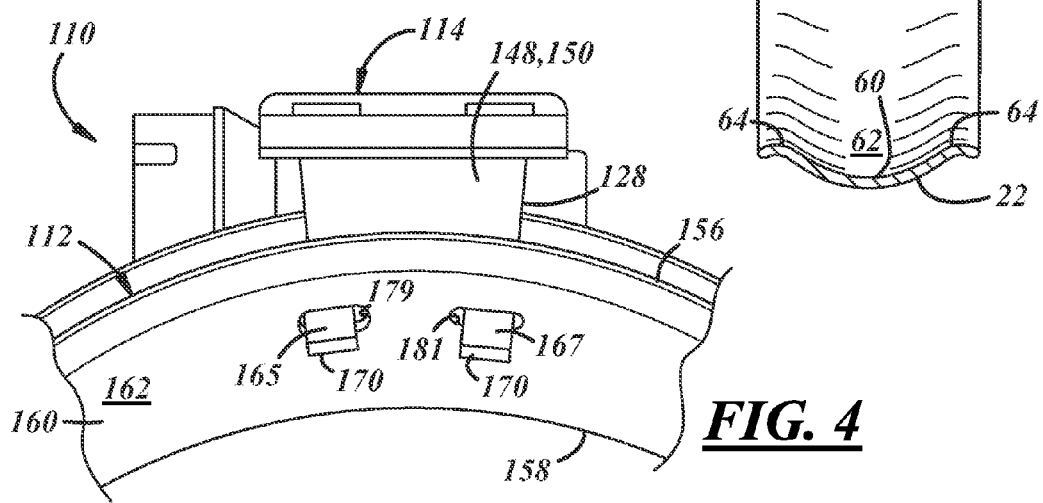
FIG. 1
FIG. 2
FIG. 4

HOSE CLAMP

CROSS-REFERENCE TO RELATED APPLICATION

This application claims the benefit of U.S. Provisional Patent Application No. 61/538,233, filed Sep. 23, 2011, the entire contents of which are hereby incorporated by reference.

TECHNICAL FIELD

This invention relates generally to hose clamps used to connect a somewhat pliant hose to a more rigid tube or component.

BACKGROUND

Hose clamps are typically used to exert a radially contracting force against an underlying hose, tube, component, or a combination thereof in order to provide a joint. The underlying hoses are typically made of rubber or another flexible material, while the tube or component is typically made of plastic, metal, or another hard material. Hose clamps commonly include a band and a worm drive mechanism to tighten the band on the hose, tube, or component. To be effective, hose clamps should provide a fluid-tight seal at the joint.

SUMMARY

In accordance with an aspect of the invention, there is provided a hose clamp that includes a band and a worm drive mechanism. The band has a first circumferential end, a second circumferential end, and a set of slots located between the first and second circumferential ends. The band also has a first axial end, a second axial end, and a generally arcuate shape in axial sectional profile between the first and second axial ends. The band further has a pocket defined at an underside of the band by the generally arcuate shape. The worm drive mechanism is connected to the band and can be operated to radially contract the band during a tightening action of the hose clamp. The worm drive mechanism includes a screw with a partially or more threaded shank that engages the slots of the band upon rotation of the screw in order to cause the radial contraction of the band. The connection between the worm drive mechanism and the band includes one or more hooks with a free end located at the pocket. Different embodiments of this hose clamp may include one or more of the following additional features either alone or according to all technically possible combinations:

- In use, the band may make sealing contact with an underlying hose substantially continuously around the contacting circumference of the band without substantial interference by the one or more hooks.
- The band may have a first rounded foot at the first axial end and may have a second rounded foot at the second axial end, the first and second rounded feet may make greater sealing contact with an underlying hose than that made by the band at the pocket.
- The free end of the one or more hooks may be located at a radial outward position relative to a center axis of the hose clamp that may be farther away from the center axis than a radially outward position of a radially-inwardly-most surface of the band.
- The band may have a cutout and the worm drive mechanism may include a saddle from which the one or more hooks may extend, and the one or more hooks may extend through the cutout at the pocket.
- The one or more hooks may have a nosed end located adjacent a cutout, and, between the free end of the one or more hooks and the nosed end, the one or more hooks may be directed generally along the circumference of the band and may be located within the pocket.
- The generally arcuate shape in axial sectional profile of the band may have an apex, the band may have a cutout at the apex, and the one or more hooks may extend through the cutout and may lay at the underside of the band adjacent the apex.
- The band may have a first cutout and may have a second cutout, the one or more hooks may include a first hook and may include a second hook, and the first hook may extend through the first cutout and the second hook may extend through the second cutout for making the connection between the worm drive mechanism and the band.
- The worm drive mechanism may include a saddle having a sidewall, the one or more hooks may extend from the sidewall, the one or more hooks may extend around the first or second axial end of the band in order to connect the saddle to the band, a recess may be located at a transition between the sidewall and the one or more hooks so that a lateral length of the one or more hooks at the axial end may be less than a lateral length of the sidewall.
- The worm drive mechanism may include a cover and may include a saddle connected to the cover via a tab of the cover or of the saddle inserted into an opening of the other of the cover or the saddle, the cover may enclose a part or more of the screw, the saddle may support the band at the worm drive mechanism, and the one or more hooks may extend from the saddle.
- The generally arcuate shape in axial sectional profile of the band may be displaced radially outwardly during the tightening action of the hose clamp and thereby may exert a force against an underlying hose after the tightening action in order to maintain a seal between the hose clamp and the underlying hose during use of the hose clamp.
- The worm drive mechanism may include one or more springs biasing the screw to effect radial contraction of the band in order to maintain a seal between the hose clamp and an underlying hose during use of the hose clamp.
- One or more spring washers may be disposed around the screw and may bear against the worm drive mechanism to effect radial contraction of the band in order to maintain a seal between the hose clamp and an underlying hose during use of the hose clamp.

In accordance with another aspect of the invention, there is provided a hose clamp that includes a band, a worm drive mechanism, and a spring. The band has a first circumferential end, a second circumferential end, and a set of slots located between the first and second circumferential ends. The worm drive mechanism is connected to the band and can be operated to radially contract the band during a tightening action of the hose clamp. The worm drive mechanism includes a screw with a partially or more threaded shank that engages the slots of the band upon rotation of the screw in order to cause the radial contraction of the band. The spring causes continued radial contraction of the band against an underlying hose during use of the hose clamp in order to maintain a seal between the band and the underlying hose. Different embodiments of this hose clamp may include one or more of the following additional features either alone or according to all technically possible combinations:

The spring may cause continued radial contraction of the band against the underlying hose when the underlying hose experiences size expansion and contraction due to temperature fluctuations during use of the hose clamp.

The spring may be constituted by a generally arcuate shape in axial sectional profile of the band between a first axial end of the band and a second axial end of the band, and, during use, the axial sectional profile is displaced radially outwardly during the tightening action of the hose clamp and thereby exerts a force against the underlying hose after the tightening action in order to maintain the seal between the band and the underlying hose.

The spring may bias the screw to effect radial contraction of the band in order to maintain the seal between the band and the underlying hose.

The spring may include multiple spring washers that are disposed around the screw and that bear against the worm drive mechanism in order to maintain the seal between the band and the underlying hose.

In accordance with yet another aspect of the invention, there is provided a hose clamp that includes a band, a worm drive mechanism, and a spring. The band has a first circumferential end, a second circumferential end, and a set of slots located between the first and second circumferential ends. The band also has a first axial end, a second axial end, and a generally arcuate shape in axial sectional profile between the first and second axial ends. The worm drive mechanism is connected to the band and can be operated to radially contract the band during a tightening action of the hose clamp. The worm drive mechanism includes a screw with a partially or more threaded shank that engages the slots of the band upon rotation of the screw in order to cause the radial contraction of the band. The spring bears against the screw and bears against the worm drive mechanism in order to bias the screw to effect radial contraction of the band. The generally arcuate shape of the band and the spring cause continued radial contraction of the band against an underlying hose during use of the hose clamp in order to maintain a seal between the band and the underlying hose.

It is envisaged that the various aspects, embodiments, examples, features, and alternatives set out in the preceding paragraphs, in the claims, and/or in the following description and drawings, may be taken independently or in any combination thereof.

BRIEF DESCRIPTION OF THE DRAWINGS

Preferred exemplary embodiments of the invention will hereinafter be described in conjunction with the appended drawings, wherein like designations denote like elements, and wherein:

FIG. 1 is a side view of one embodiment of a hose clamp;

FIG. 2 is a sectional view of the hose clamp of FIG. 1, taken at arrows 2-2;

FIG. 4 is an enlarged view of another embodiment of a hose clamp;

DETAILED DESCRIPTION OF THE PREFERRED EMBODIMENTS

Figure 3:
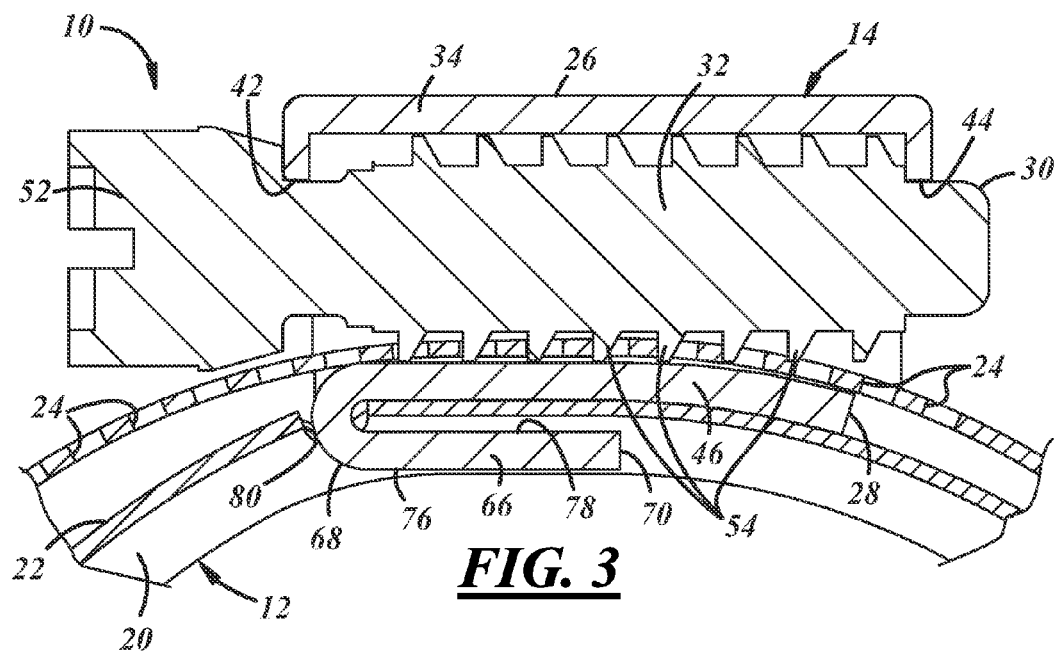
FIG. 3 is another sectional view of the hose clamp of FIG. 1.

Referring to the drawings, the figures show several embodiments of a hose clamp that provides a fluid-tight seal with an improved clamping pressure compared to some previously known hose clamps. The hose clamp is suitable for use in the automotive, aircraft, marine, heavy-duty equipment, and agricultural industries, as well as other industries and other applications. And, as used herein, the terms "hose(s)" refer to tubular bodies such as rubber or plastic hoses used for coolant lines, fluid lines, oil lines, and air ducts, as well as other lines. Furthermore, unless otherwise specified, the terms radially, axially, and circumferentially refer to directions with respect to the generally circular and somewhat cylindrical shape of the hose clamp.

Referring to FIGS. 1-3, a first embodiment of a hose clamp 10 includes a band 12 and a worm drive mechanism 14. The band 12 wraps around the associated and underlying hose and is tightened down on it and on a tube or component by the worm drive mechanism 14. The band 12 can be made of a metal material, such as tempered stainless steel or another suitable metal, and can be formed to its final shape via suitable metalworking processes. The band 12 extends in the circumferential direction between a first circumferential end 16 and a second circumferential end 18. A connection to the worm drive mechanism 14 can be located at or adjacent the first circumferential end 16, at or adjacent the second circumferential end 18, or at a position somewhere between the first and second circumferential ends. The first circumferential end 16 is free to move back-and-forth and in-and-out of the worm drive mechanism 14 during tightening and loosening of the hose clamp 10. Between the first and second circumferential ends 16, 18, the band 12 has a structurally continuous and circumferentially extending body. On a radially inwardly-facing side, the band 12 has an inner surface 20 that, in use, directly or indirectly confronts the hose; and on a radially outwardly-facing side, the band has an outer surface 22.

Furthermore, the band 12 includes multiple perforations or a set slots 24 that are located in the body of the band, and, in this embodiment, are located near the first circumferential end 16. The slots 24 are engaged by the worm drive mechanism 14 during the tightening and loosening action of the hose clamp 10. The slots 24 are spaced apart from one another and span along a section of the circumference of the band 12 for a distance determined by the expected or desired radial contraction and expansion amount of the particular application; in other embodiments, the slots can span from end-to-end along the entire circumference of the band or can stretch around the band's circumference by another amount. As shown in FIGS. 1 and 2, the slots 24 in this embodiment are located along a section of the band 12 that is flat and substantially geometrically straight in axial cross-section profile; this can ease interaction between the band 12 and a screw of the worm drive mechanism 14 and is not necessary in other embodiments. As shown in FIG. 3, in this first embodiment each of the slots 24 extends completely radially through the body of the band 12 between the inner and outer surfaces 20, 22; in other embodiments, the slots need not extend completely through the body and instead could be pinched or stepped structures formed in the band, or could have another formation. Each slot 24 can have an arcuate edge directed toward one of the first or second circumferential ends 16, 18, and can have a planar edge located opposite the arcuate edge; other edge lines and slot shapes are possible in other embodiments.

The worm drive mechanism 14 is actuated to cause radial contraction and expansion of the band 12, and keeps the band at the desired radial position and diameter after actuation. In general, the worm drive mechanism 14 is located on the outer exterior side of the band 12. In the first embodiment, the worm drive mechanism 14 includes a cover 26, a saddle 28, and a screw 30.

Still referring to FIGS. 1-3, the cover 26 serves as a roof of the worm drive mechanism 14 and encloses a threaded shank 32 of the screw 30. The cover 26 has a top wall 34 generally shaped as a half-cylinder, and has a pair of lateral walls 36 extending from the top wall. The lateral walls 36 each have openings for receiving tabs 38 that are unitary extensions of the saddle 28, and together the interconnected openings and tabs provide a mechanical connection and interlock between the cover 26 and the saddle. The cover 26 also has a skirt 40 that extends and is generally directed radially downwardly from each of the lateral walls 36. The cover 26 has a first and second open end 42, 44 on opposite sides of the top wall 34 to accommodate protruding portions of the screw 30. The saddle 28 serves as a floor of the worm drive mechanism 14 and supports and guides movement of the band 12 in-and-out of the worm drive mechanism during the tightening and loosening actions. As described in more detail below, the saddle 28 also provides part of the connection between the worm drive mechanism 14 and the band 12. Referring in particular to FIGS. 2 and 3, the saddle 28 has a bottom wall 46, a first sidewall 48 that is a unitary extension of the bottom wall, and a second sidewall 50 that is also a unitary extension of the bottom wall. The bottom wall 46 makes direct abutment and contact with the band 12, and can have a somewhat arcuate shape in cross-sectional circumferential profile as shown in FIG. 3 in order to complement and accommodate the circumferential profile of the band. The first and second sidewalls 48, 50 extend and are directed radially upwardly from the bottom wall 46. The tabs 38 extend even further radially upwardly from the sidewalls 48, 50 and are respectively inserted into the openings of the cover 26 for connection therebetween; in this example, there are a total of four tabs and four openings. Other ways of connecting the cover 26 and the saddle 28 are possible, including, for example, providing openings in the saddle and corresponding tabs in the cover.

The screw 30 is held between the cover 26 and the saddle 28, and is rotated to engage the slots 24 of the band 12 during the tightening and loosening actions. Referring in particular to FIG. 3, the screw 30 is generally arranged tangentially relative to the circumference of the band 12. The screw 30 has a head 52 and has the threaded shank 32 as a unitary extension of the head. In assembly, the head 52 is located outside of the cover 26 for accessibility, while the threaded shank 32 is enclosed mostly inside of the cover. The threaded shank 32 has threads that are inserted into the slots 24 and, upon rotation of the screw 30, move the band 12 in-and-out of the cover 26 and the saddle 28. Though not shown in this embodiment, the screw 30 can have one or more protrusions, such as a terminal end cap, bearing against the cover 26 in order to help prevent the screw from moving in its longitudinal direction while being rotated, and help ensure that the screw rotates in-place inside of the cover.

In other embodiments, the worm drive mechanism can have different designs and constructions than those shown in the figures and described above. For example, the worm drive mechanism could have a one-piece construction in which the cover and the saddle are portions of a single piece; here, there would be no need for an interconnecting structure between cover and saddle.

Maintaining clamping pressure over the lifetime of a joint is often desirable and sometimes needed in a given application. In some known hose clamps, however, the clamping pressure diminishes over time due to age, temperature fluctuations and the resulting thermal expansions and contractions, and due to other causes. This can weaken the seal at the joint and lead to ineffectiveness and leakage. In at least some of the embodiments disclosed herein, the hose clamp 10 is provided with a clamping-pressure-restoring construction and capability, or a pre-loaded sealing force, so that suitable clamping pressure is substantially maintained over the useful lifetime of the hose clamp and an effective seal is therefore provided. In this embodiment, the clamping-pressure-restoring construction is provided in the form of a spring constituted by an arcuate shape of the band's body.

Referring to FIG. 2, the band 12 has a generally arcuate and curvilinear cross-section in axial profile between a first axial end 56 and a second axial end 58. As previously described, however, the arcuate shape can be absent at the flat shaped section of the band 12 with the slots 24. Where present, there can be only a single arc spanning between the first and second axial ends 56, 58, as shown in the figures. An apex or crest 60 of the arcuate shape resides between the first and second axial ends 56, 58 and is at an approximate central region of the band 12 in this embodiment. A pocket 62 is located at a radial underside of the band 12 and is defined in part by the apex 60, the inner surface 20, and the first and second axial ends 56, 58. The pocket 62 is the result of the band's mostly concave curvature. As shown in FIG. 2, the first and second axial ends 56, 58 have rounded feet 64 near their free ends and terminal extremities in order to provide a somewhat dull contact interface against the underlying hose, as compared to a sharper interface that could come from non-rounded feet though this is an option for some embodiments. The rounded feet 64 are curled end portions of the band 12. In use, the rounded feet 64 may exert a greater magnitude of clamping pressure compared to a previously known flat-profiled band without feet because the rounded feet provide less area through which tightening force is exerted.

The arcuate profile of the band 12 imparts a restoring effect to the clamping pressure over the use of the hose clamp 10 without the need of re-tightening of the worm drive mechanism 14. Upon initial tightening, the axial ends 56, 58 are flexed and displaced radially outwardly and the apex 60 is physically flattened to a greater extent than when it is at rest, and the band 12 thus loses some of its concave curvature. The elasticity of the metal material causes the band 12 to exert a continued force and tension against the hose. In a sense, the arcuate profile of the band functions like a leaf spring. Though the amount of flattening may wax and wane during use, the force remains over time and during temperature fluctuations, and the clamping pressure of the hose clamp 10 is substantially restored and maintained during use.

In the first embodiment of FIGS. 1-3, a hook 66 is used to connect the band 12 and the worm drive mechanism 14 together. Referring in particular to FIGS. 2 and 3, the hook 66 is a unitary extension of the bottom wall 46 of the saddle 28 folded back toward itself; in other embodiments, the hook could be a separate and distinct piece attached to the saddle. As shown, the hook 66 extends from a terminal circumferential end of the bottom wall 46 and, in assembly, the hook's longitudinal axis and greatest dimension is directed generally along and generally follows the circumference of the band 12. The hook 66 has a nosed end 68, a free end 70, a first axial end 72, and a second axial end 74. On a radially inwardly-facing side, the hook 66 has an inner surface 76 that, in use, directly confronts the hose; and on a radially outwardly-facing side, the hook has an outer surface 78 that directly confronts the inner surface 20 of the band 12 across a space defined radially between the hook's outer surface and the band's inner surface.

In assembly in the first embodiment, the hook 66 extends through a single cutout 80 in the band 12. The cutout 80 is located generally at the apex 60 of the band 12 so that, when projected and routed therethrough, the hook 66 lies radially underneath the band and is tucked within the pocket 62. Here, and as shown best in FIG. 2, the first axial end 72 of the hook 66 directly confronts the inner surface 20 of the band 12 in the axial direction, and the second axial end 74 of the hook directly confronts the inner surface of the band in the opposite axial direction. And, as already mentioned, the outer surface 78 of the hook 66 directly confronts the inner surface 20 of the band 12 in the radially-outward direction. Referring to FIG. 2, at the first and second axial ends 56, 58, the inner surface 20 of the band 12 is located at a radial position from a center axis A of the hose clamp 10 by a smaller distance compared to the radial position from the center axis A of the inner surface 76 of the hook 66. In other words, the inner surface 20 at the axial ends 56, 58 is physically closer to the center axis A than the inner surface 76 of the hook 66. This means that the axial ends 56, 58 of the band 12 can make abutting contact with the underlying hose upon initial placement of the hose clamp 10 on the hose clamp, and during subsequent tightening of the worm drive mechanism 14.

In the disclosed embodiments, the connection that keeps the band 12 and the worm drive mechanism 14 together facilitates a substantially continuous fluid-tight seal around the circumference of the hose clamp 10. In some previously known hose clamps, the seal is discontinuous around the clamp's circumference and is interrupted at a connection of a worm drive mechanism and band; at the connection, portions of the worm drive mechanism can often interfere with and physically prevent contact between the band and the underlying hose or can otherwise interfere with the clamping pressure applied at the connection; thus leakage occurs more readily at the connection. In the first embodiment as described immediately above, the hook 66 is tucked underneath the band 12 at the apex 60 and pocket 62, and therefore causes limited or no interference to the fluid-tight seal around the circumference. The band 12 makes suitable sealing contact with the hose at the first and second axial ends 56, 58 at the connection and all around the circumference of the band.

FIG. 4 shows a second embodiment of a hose clamp 110. The hose clamp 110 of the second embodiment has similarities to the hose clamp 10 of the first embodiment, and some of these similarities will not be repeated. A connection between a band 112 and a worm drive mechanism 114 of the hose clamp 110 is different in some ways than that of the first embodiment. Referring to FIG. 4, a first hook 165 and a second hook 167 are used to connect the band 112 and the worm drive mechanism 114 together. The first and second hooks 165, 167 can be extensions of a bottom wall of a saddle 128, or can be extensions of first and second sidewalls 148, 150 (only one sidewall shown). Each of the hooks 165, 167 has a free end 170 which can be curled or otherwise bent underneath the band 112. In assembly in the second embodiment, the first hook 165 extends through a first cutout 179 in the band 112, and the second hook 167 extends through a second cutout 181 in the band. The first and second cutouts 179, 181 can be located at or near an apex 160 of the arcuately-profiled band 112 so that, when projected therethrough, the first and second hooks 165, 167 lie radially underneath the band and are tucked in a pocket 162.

Similar to the first embodiment, first and second axial ends 156, 158 of the band 112 are located at a radial position from the center axis A of the hose clamp 110 by a smaller distance compared to the radial position from the center axis A of the free ends 170 of the hooks 165, 167. In the second embodiment too, this connection that keeps the band 112 and the worm drive mechanism 114 together facilitates a substantially continuous fluid-tight seal around the circumference of the hose clamp 110. In alternatives to the second embodiment, there could be more hooks extending from the saddle and more corresponding cutouts in the band; for example, a first pair of hooks could extend from the bottom wall on one axial side, and a second pair of hooks could extend from the bottom wall on the opposite axial side.

Figure 5:
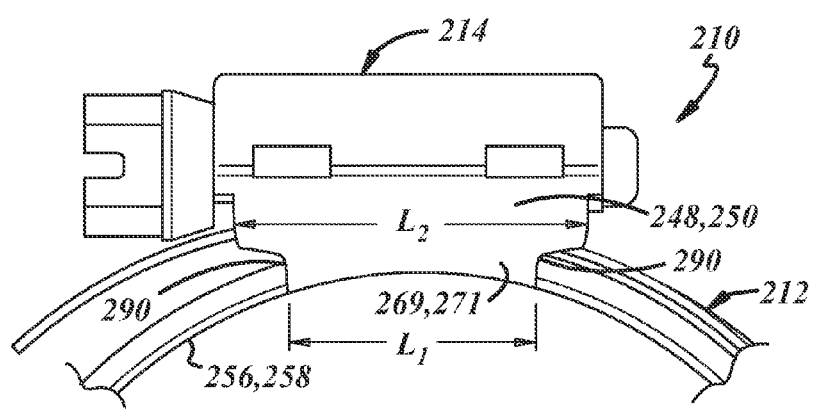
FIG. 5 is an enlarged view of yet another embodiment of a hose clamp.

FIG. 5 shows a third embodiment of a hose clamp 210. The hose clamp 210 of the third embodiment has similarities to the hose clamp 10 of the first embodiment, and some of these similarities will not be repeated. A connection between a band 212 and a worm drive mechanism 214 of the hose clamp 210 is different in some ways than that of the first embodiment. Referring to FIG. 5, a first hook 269 and a second hook 271 are used to connect the band 212 and the worm drive mechanism 214 together (only one side of the hose clamp 210 is shown; the side not shown resembles that of FIG. 5). The first and second hooks 269, 271 are unitary extensions of respective first and second sidewalls 248, 250. The first hook 269 extends radially inwardly from the first sidewall 248 and is wrapped around a first axial end 256 of the band 212 and radially underneath the band. Likewise, the second hook 271 extends radially inwardly from the second sidewall 250 and is wrapped around a second axial end 258 of the band 212 and radially underneath the band. The free ends of the hooks 269, 271 can be located at or near an apex of the arcuately-profiled band 212 so that they are tucked in a pocket thereat, as similarly described in previous embodiments.

A recess or step 290 is located on each side of an intersection of, and transition between, the respective sidewall 248, 250 and hook 269, 271. Each hook 269, 271 has a circumferential or lateral length $L_1$ that is less than a circumferential or lateral length $L_2$ of the respective sidewall 248, 250, creating a step-like transition between the hooks and sidewalls. In this way, in the third embodiment too, this connection that keeps the band 212 and the worm drive mechanism 214 together facilitates a substantially continuous fluid-tight seal around the circumference of the hose clamp 210. Minimizing the circumferential length $L_1$ reduces or altogether eliminates interruption and interference of contact between the band 212 and the underlying hose. In alternatives to the third embodiment, the recess could be in the form of a tapered edge of the sidewall and the hook in order to provide the hook with a reduced circumferential length.

Figure 6:
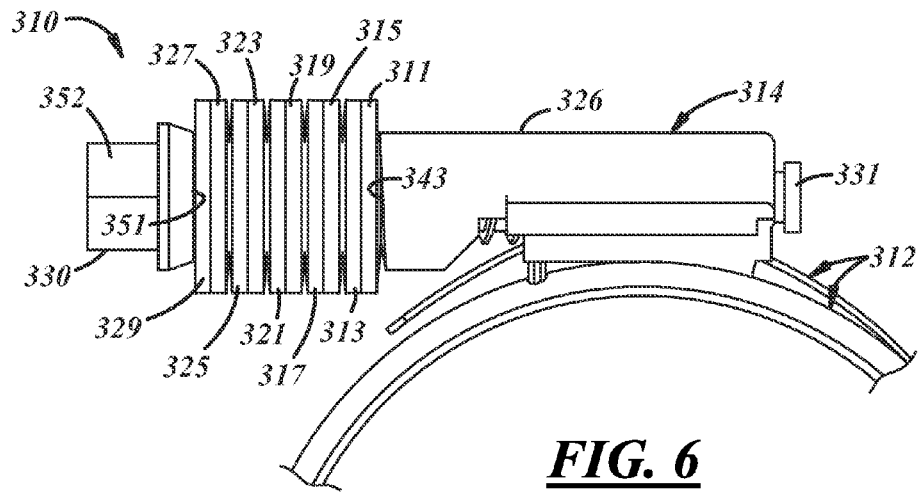
FIG. 6 is an enlarged view of yet another embodiment of a hose clamp.
Figure 7:
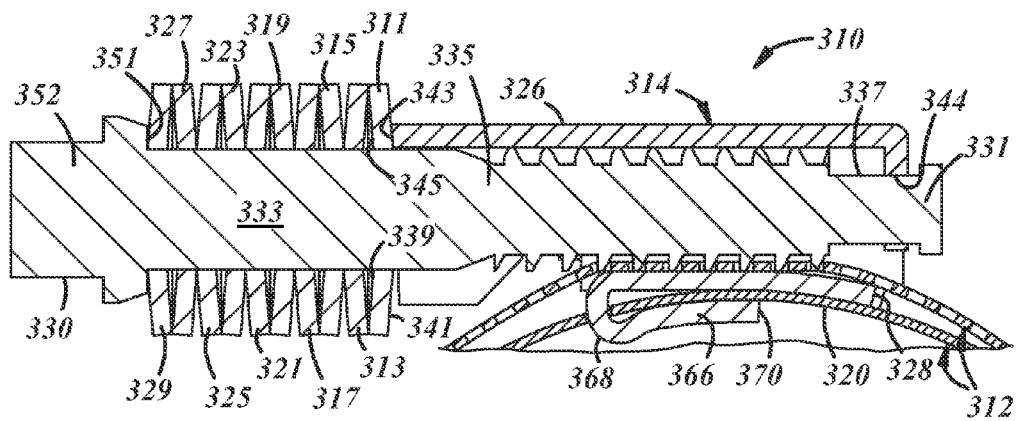
FIG. 7 is a sectional view of the hose clamp of FIG. 6.
Figure 8:
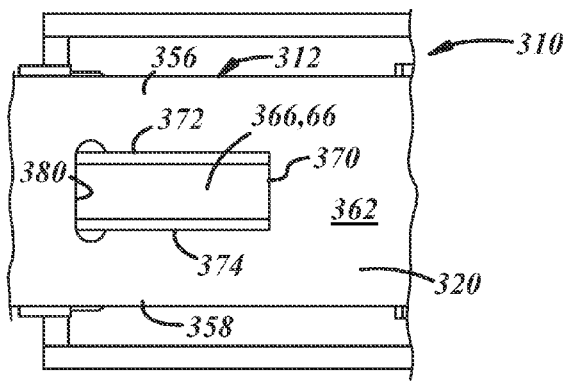
FIG. 8 is an enlarged view showing a connection between a band and a worm drive mechanism of the hose clamp of FIG. 6.

FIGS. 6-8 show a fourth embodiment of a hose clamp 310. The hose clamp 310 of the fourth embodiment has similarities to the hose clamp 10 of the first embodiment, and some of these similarities will not be repeated. A clamping-pressure-restoring construction and effect in the fourth embodiment is provided in a different way than that of the first embodiment. Referring in particular to FIGS. 6 and 7, a spring is provided in the form of multiple frusto-conical spring washers—commonly known as Belleville washers—that are stacked up against one another between a screw 330 and a cover 326 of a worm drive mechanism 314. The stacked washers are located exteriorly of the cover 326. The stacked washers include a first washer 311, a second washer 313, a third washer 315, a fourth washer 317, a fifth washer 319, a sixth washer 321, a seventh washer 323, an eighth washer 325, a ninth washer 327, and a tenth washer 329 arranged consecutively next to and abutting one another between an open free end 343 of the cover 326 and a flange surface 351 of a screw head 352. The first washer 311 directly abuts the open free end 343 and the tenth washer 329 directly abuts the flange surface 351. The washers are disposed around an unthreaded section 333 of a shank 335. Each of the washers has a concave face 339 and an opposite convex face 341. Of the ten washers, neighboring washers are paired off for a total of five pairs, with each pair having their concave faces 339 directed toward and confronting each other across a defined cavity 345 therebetween. As shown best in FIG. 7, the confronting concave faces 339 make line contact at a circular interface at their outermost ends. In other embodiments, for example, the spring could be provided in another form such as a helical spring disposed around the screw or merely disposed against the screw to bias the screw and the band toward the tightening direction; a different number of washers could be provided including more or less than ten and including a single washer; the washers could be disposed around the screw at another location including at an opposite end of the screw than that shown in the figures; and, in the case of another form of spring such as a helical spring, the spring could be located inside of the cover.

Upon rotation of the screw 330 and tightening of the hose clamp 310, the first through tenth washers 311-329 are compressed and displaced laterally inwardly toward one another. That is, the washers are squeezed between the open free end 343 and the flange surface 351. The size of the cavities 345 are contracted as each of the washers is physically flattened to a greater extent than when it is at rest. The squeezed washers then exert a continued force and tension against the screw 330 and the cover 326 which remains and provides the clamping-pressure-restoring effect. If, for example, the underlying hose, tube, or both are contracted in size due to a decreased temperature, the squeezed washers accommodate this contraction by expanding and displacing laterally outwardly. The screw 330 moves accordingly and pulls a band 312 to radially contract it and tightens the hose clamp 310 down on the slightly smaller underlying hose and tube. In this way, the clamping pressure of the hose clamp 310 is substantially restored and maintained over the useful lifetime of the hose clamp and an effective seal is therefore provided.

Furthermore, in the fourth embodiment, the screw 330 includes a terminal end cap 331. The terminal end cap 331 is a radially expanding and flange-like portion of the screw 330 that is located outside of the cover 326 on an opposite side of the cover as the washers. Upon rotation of the screw 330 and tightening of the hose clamp 310, the terminal end cap 331 can bear against the cover 326 in order to help prevent the screw from moving in its longitudinal direction while being rotated, and help ensure that the screw rotates generally in-place inside of the cover. Referring in particular to FIG. 7, immediately adjacent the terminal end cap 331, an unthreaded section 337 of the shank 335 permits a somewhat limited extent of longitudinal movement and play of the screw 330 through a second open end 344 as the screw is tightened and as the washers displace laterally inwardly and outwardly.

FIG. 8 shows an underside of the band 312 and shows a connection between the band and the worm drive mechanism 314. As previously described for the first embodiment, a hook 366 is used to make the connection here in the fourth embodiment. Indeed, the connection and hook 366 shown in FIG. 8 is the same as the connection and hook 66 described for the first embodiment and shown in FIGS. 2 and 3-FIG. 8 merely provides another view of the hooks 66, 366. As before, the hook 366 is a unitary extension of a saddle 328 folded back toward itself. The hook's 366 longitudinal axis and greatest dimension is directed generally along and generally follows the circumference of the band 312. The hook 366 has a nosed end 368, a free end 370, a first axial end 372, and a second axial end 374. The hook 366 extends through a single cutout 380 in the band 312, and, as shown best in FIG. 7, the hook is bent against and makes abutting contact with an inner surface 320 of the band. In this embodiment too, the band 312 has the previously-described arcuate profile, and therefore the hook 366 is tucked within a pocket 362. As shown best by FIG. 8, the hook 366 is substantially axially centered on the underside of the band 312 between a first axial end 356 and a second axial end 358 of the band. In other embodiments, the band need not have the previously-described arcuate profile, and instead the spring washers alone could provide the clamping-pressure-restoring effect in a suitable manner.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A hose clamp, comprising:
   a band having a first circumferential end, a second circumferential end, and a plurality of slots located between said first and second circumferential ends, said band having a first axial end and a second axial end, said first and second circumferential ends and said first and second axial ends being defined relative to a generally circular shape presented by said band during use of the hose clamp, and said band extending from said first axial end to said second axial end along a generally arcuate path, said band further having a pocket defined at an underside of said band by the generally arcuate shape; and
   a worm drive mechanism connected to said band and operable to radially contract said band during a tightening action of the hose clamp, said worm drive mechanism including a screw with an at least partially threaded shank that engages said slots of said band upon rotation of said screw to cause the radial contraction of said band, the connection between said worm drive mechanism and said band including at least one hook with a free end located at said pocket.

2. The hose clamp of claim 1, wherein, in use, said band makes sealing contact with an underlying hose substantially continuously around the contacting circumference of said band without substantial interference by said at least one hook.

3. The hose clamp of claim 1, wherein said band has a first rounded foot at said first axial end and has a second rounded foot at said second axial end, said first and second rounded feet making greater sealing contact with an underlying hose than that made by said band at said pocket.

4. The hose clamp of claim 1, wherein said free end of said at least one hook is located at a radial outward position relative to a center axis of the hose clamp that is farther away from the center axis than a radially outward position of a radially-inwardly-most surface of said band.

5. The hose clamp of claim 1, wherein said band has a cutout, and said worm drive mechanism includes a saddle from which said at least one hook extends, and said at least one hook extends through said cutout at said pocket.

6. The hose clamp of claim 5, wherein said at least one hook has a nosed end adjacent said cutout, and, between said free end of said at least one hook and said nosed end, said at least one hook is directed generally along the circumference of said band and is located within said pocket.

7. The hose clamp of claim 1, wherein the generally arcuate path has an apex, said band has a cutout at said apex, and said at least one hook extends through said cutout and lies at said underside of said band adjacent said apex.

8. The hose clamp of claim 1, wherein said band has a first cutout and a second cutout, said at least one hook includes a first hook and a second hook, and said first hook extends through said first cutout and said second hook extends through said second cutout for the connection between said worm drive mechanism and said band.

9. The hose clamp of claim 1, wherein said worm drive mechanism includes a saddle having a sidewall, said at least one hook extends from said sidewall, said at least one hook extends around said first or second axial end to connect said saddle to said band, a recess is located at a transition between said sidewall and said at least one hook so that a lateral length of said at least one hook at said axial end is less than a lateral length of said sidewall.

10. The hose clamp of claim 1, wherein said worm drive mechanism includes a cover and a saddle connected together via a tab of said cover or of said saddle inserted into an opening of the other of said cover or said saddle, said cover encloses at least a part of said screw, said saddle supports said band at said worm drive mechanism, and said at least one hook extends from said saddle.

11. The hose clamp of claim 1, wherein the generally arcuate path of said band is displaced radially outwardly during the tightening action of the hose clamp and thereby exerts a force against an underlying hose after the tightening action in order to maintain a clamping pressure on an underlying hose during use of the hose clamp.

12. The hose clamp of claim 1, further comprising at least one spring that biases said screw to effect radial contraction of said band in order to maintain a clamping pressure on an underlying hose during use of the hose clamp.

13. The hose clamp of claim 12, wherein said at least one spring is an at least one spring washer that is disposed around said screw and that bears against said worm drive mechanism.

14. A hose clamp, comprising:
 a band having a first circumferential end, a second circumferential end, and a plurality of slots located between said first and second circumferential ends;
 a worm drive mechanism connected to said band and operable to radially contract said band during a tightening action of the hose clamp, said worm drive mechanism including a screw with an at least partially threaded shank that engages said slots of said band upon rotation of said screw to cause the radial contraction of said band; and
 a spring causing continued radial contraction of said band against an underlying hose during use of the hose clamp in order to maintain a clamping pressure on the underlying hose, wherein said spring is constituted by a generally arcuate shape in axial sectional profile of said band between a first axial end of said band and a second axial end of said band, and, during use, the axial sectional profile is displaced radially outwardly during the tightening action of the hose clamp and thereby exerts a force against the underlying hose after the tightening action in order to maintain the clamping pressure on the underlying hose, said first and second circumferential ends and said first and second axial ends of said band being defined relative to a generally circular shape presented by said band during use of the hose clamp.

15. The hose clamp of claim 14, wherein said spring causes continued radial contraction of said band against the underlying hose when the underlying hose experiences size expansion and contraction due to temperature fluctuations during use of the hose clamp.

\* \* \* \* \*